March 24, 1959     E. SCHLUETER     2,878,550
TUBULAR SAW BX ARMOR CUTTING TOOL AND TUBE CUTTER
Filed June 20, 1952     2 Sheets-Sheet 1

INVENTOR.
ERNEST SCHLUETER
BY
ATTORNEY.

March 24, 1959 E. SCHLUETER 2,878,550
TUBULAR SAW BX ARMOR CUTTING TOOL AND TUBE CUTTER
Filed June 20, 1952 2 Sheets-Sheet 2
FIG. 4. FIG. 5. FIG. 7. FIG. 8.
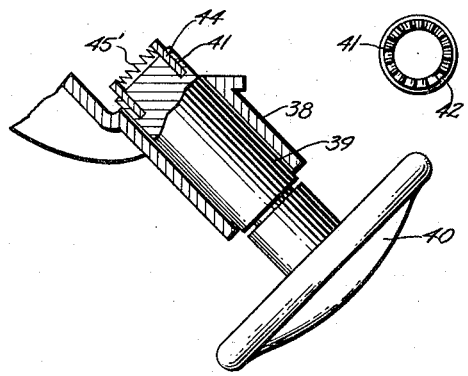
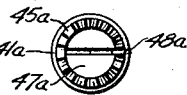
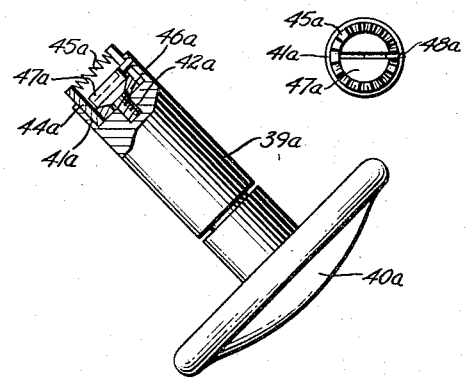
FIG. 6. FIG. 9.
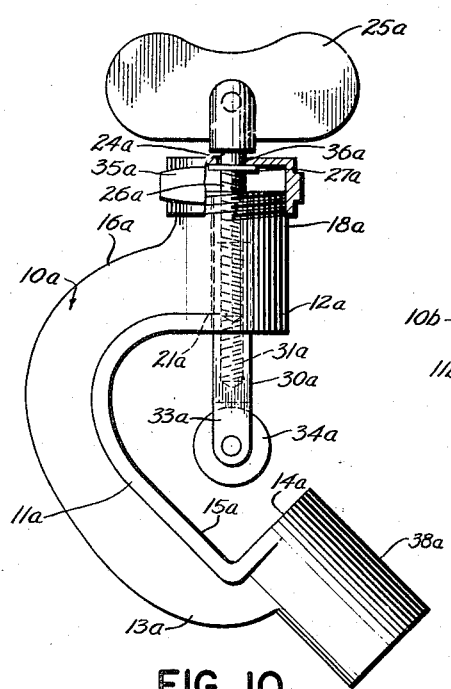
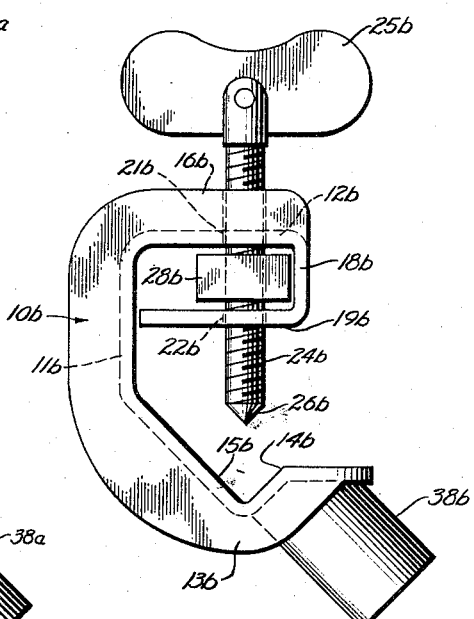
FIG. 10.
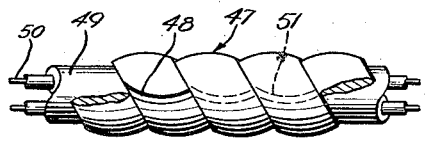
INVENTOR.
ERNEST SCHLUETER
BY
ATTORNEY.

United States Patent Office 2,878,550
Patented Mar. 24, 1959

2,878,550

TUBULAR SAW BX ARMOR CUTTING TOOL AND TUBE CUTTER

Ernest Schlueter, Troy, N.Y.

Application June 20, 1952, Serial No. 294,697

16 Claims. (Cl. 29—67)

This invention relates to cutters and more particularly to tools for cutting the armor of armored cables, and for cutting pipe, though it is noted that in many of the claims the invention is not limited to cutting armor or pipe.

Objects of the invention are to provide an improved tool of this kind which is small and easily portable in the pocket and which works to quickly cut pipe or to cut armor without cutting into the cable or its insulation.

Other objects of the invention are to provide a single improved tool of this kind which can serve both as a pipe cutter and an armor cutter.

Additional objects of the invention are to effect simplicity and efficiency in such tools and to provide an extremely simple device or apparatus of this kind which is easy, effective, durable and reliable in operation, and economical to manufacture.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with several forms of armor cutter, each of which briefly stated, includes a frame having a jaw at the one end having angularly meeting inner and outer faces forming an interior angular seat, and screw operated means mounted on the other end of the frame for mounting a clamping means for clamping an armored cable on said faces.

The free end part of said jaw has a smooth bearing opening, approximately axially parallel with the inner face of said seat, in which is rotatable and slidable a smooth saw-carrying shaft having a handle at the outer end, and on the inner end a substantially cylindrical saw mounted coaxially of the shaft and having an annular projecting toothed edge in a plane substantially perpendicular to the axis of the shaft adapted to engage an armored cable clamped by the clamping means in said seat across the main plane of the frame. When the shaft is pressed inwardly and rotated by the handle, one or more convolutions of the armor may be cut through by said teeth.

In two forms of the invention, the clamping means includes a pipe cutting disk. Instead of the armored cable, a pipe may be clamped across the seat by the cutting disk, whereupon on withdrawing or removing the saw-carrying shaft, the tool may be moved around the pipe while pressing the cutting disk on the pipe by the screw operated means, thus using the tool as a pipe cutter.

In one form of the invention the cutting disk is omitted, the free end of the clamping screw pressing the armored cable on the seat.

In the accompanying drawing showing, by way of example, three of many possible embodiments of the invention, Fig. 1 is a vertical sectional view partly in elevation of one form of the invention, the section being taken on the line 1—1 of Fig. 2;

Fig. 4 is a fragmental side elevation, partly in section of another form of saw-carrying shaft;

Fig. 5 is an inner end elevation of said shaft;

Fig. 6 is a side elevation, partly in section, of another form of armor and pipe cutter;

Fig. 7 is a side elevation, partly in section of still another form of saw-carrying shaft;

Fig. 8 is an inner end elevation of the shaft of Fig. 7;

Fig. 9 is a side elevation of still another form of armor cutter; and

Fig. 10 shows a side elevation of the armor cut by said cutters.

Figure 1:
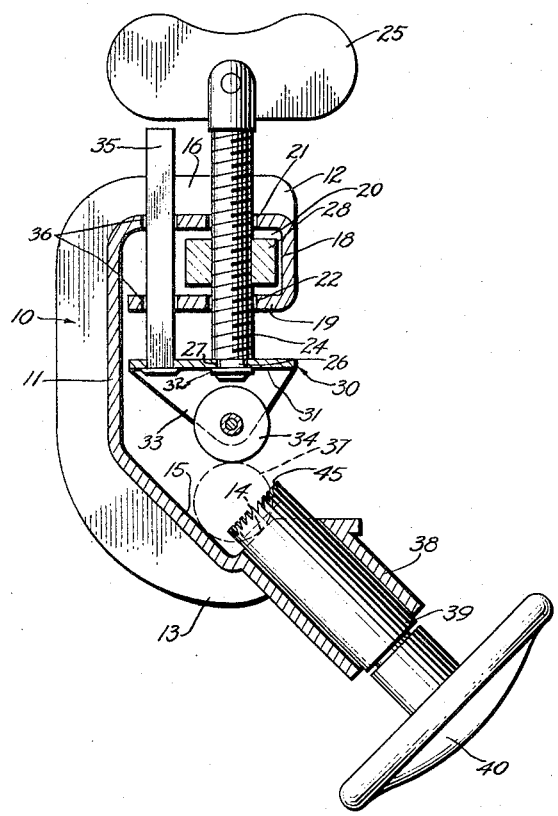
Figure 2:
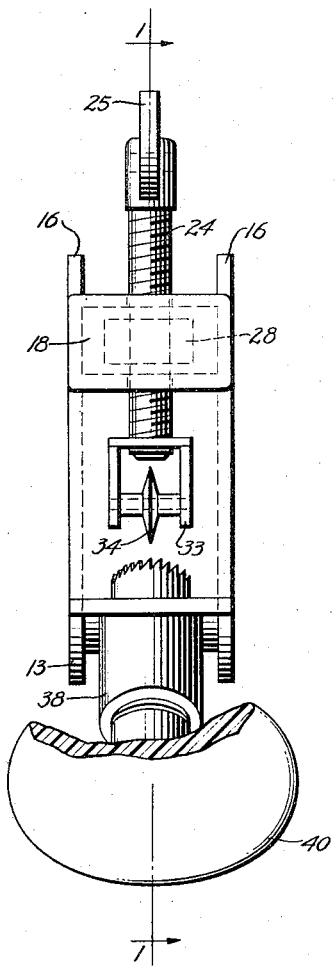
Fig. 2 is a front elevation.
Figure 3:
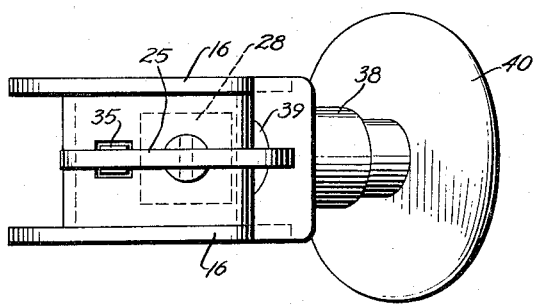
Fig. 3 is a plan.

The various parts of my improved tube and BX armor cutter of Figs. 1 to 3 are carried on a sheet metal C-shaped frame 10 comprising an elongated yoke portion 11, a bearing portion 12 at right angles thereto at one end, and an angularly hooked jaw 13 at the other end forming an angular seat 14, 15 facing the bearing portion, said frame having strengthening flanges 16 at the side edges.

The bearing portion 12 is formed at the free end with a perpendicular outer wall 18 turned toward said jaw and carrying an inner wall 19 spaced from the bearing portion and forming a nut housing 20. The bearing portion 12 and inner wall 19 have alined main round bearing openings 21, 22 remote from the yoke portion and approximately alined with said seat 14, 15 and receiving a combined clamping and cutter carrying screw 24 slidable in said bearing openings and provided with an outer wing head 25, and an inner reduced bearing end 26. An angular nut 28 on said screw in said housing engages said outer wall 18 to prevent the nut from turning around.

A cutter bracket 30 comprises a bearing plate 31 having a bearing opening 27 receiving said reduced bearing end 26. A washer 32 is riveted on said reduced end 26. Spaced ears 33 are formed on the plate 31 and extended toward said seat 14, 15 and carry a cutter disk 34 in the main plane of the frame and journaled between said ears. A guide bar 35 of rectangular cross-section fast on said plate 31 is slidable in rectangular guide openings 36 in the bearing portion 12 and wall 19, whereby when the screw is rotated said cutter and bracket are moved toward or from said seat and are prevented from turning around on the axis of the screw, and whereby said cutter disk may be brought into engagement with a pipe on said seat, 14, 15 in the position of the dotted line 37 to be cut when the cutter is moved around the pipe.

The free end part of said jaw 13 has at its outer end, a bearing sleeve 38 joining the jaw, said jaw and sleeve having a smooth bearing opening therein having its axis approximately parallel with the inner face 15 of said seat, and receiving a short smooth saw-carrying shaft 39 carrying a disk-shaped handle knob 40 at its outer end, and having its inner end formed with an annular toothed edge 45 spaced from the seat face 15.

Instead of having the shaft 39 formed with the toothed edge, the shaft may have its inner end face provided in its margin with a substantially annular groove 41, as in Fig. 4, interrupted by a small transverse wall 42 (Fig. 5). A saw 44 disposed in and substantially filling said groove and having ends engaging said wall 42, has a toothed edge 45' projecting from the end face and spaced from said inner face 15 of the seat. Said transverse wall 42 prevents the saw from turning around in the groove.

An armored cable 47 (Fig. 10) may be clamped by the cutter disk 34 in said seat 14, 15 across the main plane of the frame, in the position of the dotted line 37 of Fig. 1, with the axis of the shaft substantially tangential to the armor or offset from the axis of the armor, in position to give the cut 48 of Fig. 10, and may receive the teeth 45 of the saw when the shaft 39 is pressed inwardly and rotated by the handle until a convolution of the armor is cut through, as at 48, and the cutting is limited by engagement of said end face of the shaft with the armor, thus to prevent cutting into the insulation 49 or into any of the wires 50 of the cable. Additional cuts as at the dotted lines 51 may be made if desired.

Figs. 7 and 8 show another form of saw-carrying shaft, later to be described, which may be used with the frame of Fig. 1.

My improved tube and BX armor cutter of Figs. 6 to 8 comprises a cast metal C-shaped frame 10a having a yoke portion 11a, a bearing portion 12a substantially at right angles thereto at one end, and an angularly hooked jaw 13a at the other end forming an angular seat 14a, 15a facing the bearing portion, said frame having a strengthening rib 16a at the mid plane of the frame.

Said bearing portion 12a is formed with a perpendicular outer sleeve 18a pointed away from said jaw and alined with the mid part of the seat 14a, 15a. Said bearing portion and the sleeve 18a have a slide bearing opening 21a of square cross section in which is slidable a combined clamping and cutter carrying bar 30a provided with threaded axial bore 31a open at the outer end, said bar having a bifurcated inner end forming ears 33a between which is journaled a cutter disk 34a in the main plane of the frame. A screw cap 35a on the outer end of the sleeve has a central bearing opening 36a in which is rotatable a screw 24a having an outer wing head 25a and a threaded inner and intermediate portion 26a received in said threaded axial bore 31a. A disk collar 27a fast on the screw 26a between said cap and sleeve prevents longitudinal movement of the screw, whereby when the screw is rotated said bar and cutter are moved toward or from said seat, the squared bar 30a preventing the cutter from turning around on the axis of the screw, whereby said cutter disk may be brought into engagement with a pipe on said seat 14a, 15a, to be cut when the cutter is moved around the pipe. The free end part of said jaw has at its outer end, a bearing sleeve 38a joining the jaw, said jaw and sleeve having smooth bearing openings therein having its axis approximately axially parallel with the inner face 15a of said seat. The smooth saw-carrying shaft 39 of Figs. 1 and 4 or the shaft 39a (Fig. 7) may be used in said smooth bearing opening 38a. The shaft 39a carries a disk-shaped handle knob 40a at its outer end, and has in the inner end a circular recess 41a nearly as large in diameter as the shaft. A saw 44a disposed in said recess and engaging the bottom and side wall of the recess shaft has approximately meeting ends and a toothed edge 45a projecting from the end of the shaft. An inwardly beveled washer 46a in the lower part of the recess engages the inner side face of the saw. A screw 42a screwed in the inner end of the shaft axially thereof has an inwardly tapered slotted head 47a engaging the taper of the washer, outwardly forcing the washer to clamp the saw in place. A short pin 48a (Fig. 8) in the side wall of said recess engages between the ends of the saw to prevent the saw from turning around in the recess.

The armored cable 47 as in Fig. 10 may be clamped by the cutter disk 34a in said seat 14a, 15a across the main plane of the frame and receive the teeth 45a of the saw when the shaft 39a is pressed inwardly and rotated by the handle until a convolution of the armor is cut through, as at 48, and the cutting is limited by engagement of the outer face of the screw head 47a with the armor, thus to prevent cutting into the insulation or any of the wires of the cable.

In the form of invention of Fig. 9, the C-shaped frame 10b is similar in shape to that of Fig. 1 and has an angularly hooked jaw 13b forming an angular seat 14b, 15b facing the bearing portion 12b as in Fig. 1. The bearing portion 12b is formed at the free end with a perpendicular outer wall 18b turned toward said jaw 13b and carrying an inner wall 19b spaced from the bearing portion 12b and forming a nut housing. Said bearing portion 12b and inner wall 19b have alined main round bearing openings 21b, 22b alined with said seat 14b, 15b. A clamping screw 24b is slidable in said bearing openings and provided with an outer wing head 25b and a pointed inner end 26b therearound. An angular nut 28b on said screw in said housing and engaging said outer wall 18b prevents the nut from turning around, whereby when the screw is rotated said pointed end is moved toward or from said seat 14b, 15b, and the nut is prevented from turning around on the axis of the screw, whereby said pointed end 26b may be brought into engagement with an armored cable on said seat, whereby the armored cable clamped by said pointed end in said seat 14b, 15b across the main plane of the frame may receive the teeth of the saw and be cut when the shaft 39 or 39a is pressed inwardly and rotated by the handle 40 as described of the cutter of Fig. 1.

Any of the saw-carrying shafts herein shown may be used with any of the C-shaped frames disclosed.

I claim as my invention:

1. A cutting tool comprising a member; means for positioning and clamping a BX armored cable on the member; a saw-carrying shaft rotatably and slidably mounted on the member and having its axis substantially tangential to the armor of the cable; and a saw fast on the inner end of the shaft having an annular toothed edge in a plane substantially perpendicular to the axis of the shaft and projecting in axial direction toward the cable and positioned to have limited cutting engagement with the armor of the cable.

2. A cutting tool comprising a member; means for positioning and clamping a BX armored cable on the member; a saw-carrying shaft rotatably and slidably mounted on the member and having its axis substantially transverse to and offset from the axis of the cable; and a saw fast on the inner end of the shaft having an annular projecting toothed edge in the plane substantially perpendicular to the axis of the shaft.

3. A cutting tool comprising a member having means mounted on the member for clamping an armored cable on said member; said member having a smooth bearing opening and having its axis approximately tangential to the armor; a smooth shaft in said bearing opening and carrying a handle at the outer end; and a saw at the inner end of the shaft having an annular projecting toothed edge in a plane substantially perpendicular to the axis of the shaft.

4. A tube and BX armor cutter comprising a C-shaped frame having an elongated yoke portion, a bearing portion at right angles thereto at one end, and an angularly hooked jaw at the other end having outer and inner faces forming an angular seat facing the bearing portion and adapted to receive an armored cable transverse to the plane of the frame; said bearing portion being formed at the free end with a perpendicular outer wall turned toward said jaw and carrying an inner wall spaced from the bearing portion and forming a nut housing; said bearing portion and inner wall having alined main round bearing openings remote from the yoke portion and alined with said seat; a clamping screw slidable in said bearing openings and provided with an outer wing head, and having an inner end pointed toward said seat; an angular nut on said screw in said housing and engaging said outer wall to prevent the nut from turning around; and a saw-carrying shaft rotatably slidably mounted on the outer end of the jaw substantially axially parallel to said inner face; and a saw having an annular projecting toothed edge in a plane substantially perpendicular to the axis of the shaft and positioned to have limited cutting engagement with the armor of the cable.

5. A cutting tool comprising a frame having a bearing portion at one end and a jaw at the other end forming an interior angular seat facing said bearing end; said bearing portion being formed at the free end with a perpendicular outer wall turned toward said jaw and carrying an inner wall spaced from the bearing portion and forming a nut housing; said bearing portion and inner wall with alined square guide openings and having alined main round bearing openings and alined with said seat; a screw slidable in said bearing openings and provided with an outer ring head, and at the inner end with a head having an annular groove therearound; an angular nut on said screw in said housing and engaging said outer wall to prevent the nut from turning around; a cutter bracket having a bearing plate having a bearing opening receiving the screw in said groove, and spaced ears facing said seat; a cutter disk in the main plane of the frame journaled between said ears; a guide bar slidable in said guide opening and fast on said plate; whereby when the screw is rotated said cutter and bracket are moved toward or from said seat and are prevented from turning around on the axis of the screw; and whereby said cutter disk may be brought into engagement with a pipe on said seat to be cut when the cutter is moved around the pipe.

6. A tube and BX armor cutter comprising a C-shaped frame having yoke portion, a bearing portion substantially at right angles thereto at one end, and an angularly hooked jaw at the other end having outer and inner meeting faces forming an angular seat facing the bearing portion; said bearing portion being formed with a perpendicular outer sleeve pointed away from said jaw and alined with the mid part of the seat; said bearing portion and sleeve having alined slide bearing openings of square cross section alined with said seat; a combined clamping and cutter carrying bar of rectangular cross section fitting and slidable in said bearing openings and provided with threaded axial bore open at the outer end, said bar having a bifurcated inner end; a cutter disk in the main plane of the frame journaled between said ears; a screw cap on the outer end of the sleeve having a central bearing opening; a screw rotatable in said opening and having an outer wing head, and having a threaded inner and intermediate portion received in said axial bore; a disk collar fast on the screw between said cap and sleeve; whereby when the screw is rotated said cutter is moved toward or from said seat, the squared bar preventing the cutter from turning around on the axis of the screw; whereby said cutter disk may be brought into engagement with a pipe on said seat to be cut when the cutter is moved around the pipe.

7. A cutting tool comprising a member having a seat adapted to receive and position and hold against lateral movement in definite axial position, determined by the seat, a BX armored cable pressed in the seat; means for clamping the armored cable in the seat; a shaft rotatably and slidably mounted on the member and having its axis substantially tangential to the armor of the cable; and a tubular saw coaxially mounted on the shaft and having an annular projecting toothed edge pointing toward the armor and positioned to have cutting engagement with the armor of the cable.

8. A cutting tool comprising a member having a seat adapted to receive and position and hold against lateral movement in definite axial position a BX armored cable pressed therein; means pressing and engaging between convolutions of the armor remote from the seat for pressing and clamping the armored cable in the seat and holding the armor against longitudinal movement; a shaft rotatably and slidably mounted on the member and having its axis substantially tangential to the armor of the cable; and a tubular saw coaxially mounted on the shaft and having an annular projecting toothed edge pointing toward the armor and positioned to have cutting engagement at one semi-circumference only of the edge with the armor of the cable.

9. A BX armor cutting tool comprising a C-shaped frame having a jaw having an interior flat face; said frame carrying a part having an additional face substantially perpendicular to said flat face and forming therewith an angular seat constructed and adapted to receive and position an intermediate part remote from the ends of a long BX armored cable pressed therein; said frame carrying a part having a threaded aperture remote from and axially alined with said seat; a screw in said bore carrying at its inner end a sharp part engageable with the cable in the angle between convolutions to position and clamp the cable in the seat against axial movement; the free end part of said jaw having at its outer end a bearing sleeve joining the jaw, said jaw and sleeve having a smooth round bearing opening therein passing through said additional face and having its axis approximately tangential to the armor and parallel with said flat face of said seat; and a smooth saw-carrying shaft in said smooth bearing opening and carrying a handle at its outer end, and having an inner end provided with a tubular saw having a toothed edge engageable with the cable in said seat.

10. A cutting tool comprising a C-shaped frame having a free end part having a jaw having a free end part having an interior flat face; said frame carrying a positioning part having an additional face substantially perpendicular to said flat face and forming therewith an angular seat adapted to receive and hold against lateral movement in a definite position, determined by the seat, a BX armored cable pressed in the seat; said frame carrying a part having a threaded aperture remote from and having its axis substantially alined with said seat; a screw in said bore carrying at its inner end a sharp part engageable with the cable in the angle between convolutions of the cable to position and clamp the cable in the seat against axial movement; the free end part of said jaw having at its outer end a bearing sleeve joining the jaw, said jaw and sleeve having a smooth round bearing opening therein passing through said additional face and having its axis approximately parallel with said flat face and substantially tangential to the armor of the cable; and a smooth saw-carrying shaft freely rotatable and slidable in said smooth bearing opening and carrying a handle at its outer end, and having an inner end provided with a tubular saw having a toothed edge engageable with the cable in said seat.

11. A cutting tool comprising a frame having a jaw at one end having substantially joining interior inner and outer faces substantially perpendicular to each other and forming within the frame an interior angular seat and adapted to receive and definitely seat a BX armored cable pressed against said faces in a position determined by the faces; screw operated means mounted on the other end of the frame and having a part engageable with the armor for forcing it in said seat and holding the armor in a definite position determined by said faces; the free end part of said jaw having a bearing opening therein smooth and round throughout and passing through said outer face and having its axis approximately parallel with said inner face and substantially tangential to the armor; a smooth round saw carrying shaft rotatably and slidably fitting in said smooth bearing opening and carrying a disk-shaped handle at the outer end; a substantially cylindrical tubular saw coaxially mounted in the inner end of the shaft and having an annular projecting toothed edge having teeth projecting toward the armor and rotatably engageable with the armor; whereby the armored cable clamped by said part in said seat across the main plane of the frame may receive the teeth of the saw when the shaft is pressed inwardly and rotated by the handle until a convolution of the armor is cut through.

12. A BX armor cutting tool comprising a frame having a free end part having a jaw at one end having inner and outer interior seating faces substantially perpendicular to each other and substantially joining in a line of intersection and forming an interior angular seat within the frame adapted to receive, position and hold against lateral movement in a definite position determined by said seat a BX armored cable pressed in said seat against said faces; an elongated screw operated structure mounted on the other end of the frame and longitudinally movable in a path substantially perpendicular to said line and having a sharp part engageable between convolutions of the armor at the side opposite said seat for forcing it in said seat and holding the armor against longitudinal and lateral movement in a definite position determined by said faces and said sharp part; said jaw having a smooth round bearing opening passing through said outer face approximately parallel with said inner face and having its axis substantially tangential to the armor and having its axis intersecting said path at about 45 degrees; a smooth round saw carrying shaft rotatably and slidably fitting in said smooth bearing opening and carrying a handle at the outer end; and a substantially cylindrical tubular saw coaxially mounted on the inner end of the shaft having its axis offset from the axis of the armor and tangential to the armor and having an annular projecting toothed edge having teeth projecting toward the armor and having cutting engagement, at one semi-circumference of said edge at a time, with the armor; whereby a convolution of a cable armor clamped by said part in said seat across the main plane of the frame may be completely cut through by said saw and severed while in one position on said seat.

13. A tool as in claim 12, said shaft being provided with a part within the saw having a face spaced from a plane of the teeth and engageable with the armor when and as soon as cut through by the teeth to limit the penetration of the teeth and to prevent cutting the insulation or wires of the cable.

14. A tool as in claim 12, said shaft having adjacent to the cable a circular recess nearly as large in diameter as the shaft and provided at the inner end with an axial threaded bore; a saw disposed in said recess and engaging the side wall of the recess and having a toothed edge projecting from the end of the shaft and having approximately meeting ends; a washer engaging the inner side face of the recess and having an inwardly beveled inner face; a screw in said axial bore and having a slotted head engaging said inner beveled face of the washer and forcing the washer outwardly and clamping the saw in place; a short pin in the side wall of said recess engaging between the ends of the saw to prevent the saw face turning around in the recess; whereby an armored cable clamped by the cutter disk in said seat across the plane of the frame may receive the teeth of the saw when the shaft is pressed inwardly and rotated by the handle until a convolution of the armor is cut through and the cutting is limited by engagement of the outer end face of the screw with the armor, thus to prevent cutting into the insulation or any of the wires of the cable.

15. A tool as in claim 12, said sharp part comprising a disk rotatably mounted on said structure axially parallel to said armor and having a sharp cutting edge engageable between said convolutions.

16. A tool as in claim 12, said sharp part comprising a conically pointed end on said structure pointing toward the armor and engageable between convolutions thereof.

References Cited in the file of this patent

UNITED STATES PATENTS

| | | |
|---|---|---|
| 475,247 | Piper | May 17, 1892 |
| 832,546 | Glidden | Oct. 2, 1906 |
| 1,422,066 | Vafiades et al. | July 4, 1922 |
| 1,595,674 | Marshall | Aug. 10, 1926 |
| 1,597,606 | Lee | Aug. 24, 1926 |
| 1,836,751 | Delaney | Dec. 15, 1931 |
| 2,312,933 | Seiders | Mar. 2, 1943 |
| 2,642,651 | St. Palley | June 23, 1953 |

FOREIGN PATENTS

| | | |
|---|---|---|
| 24,695 | Great Britain | Dec. 4, 1901 |
| 192,929 | Great Britain | Feb. 15, 1923 |
| 203,570 | Great Britain | Sept. 13, 1923 |
| 566,612 | Great Britain | Jan. 5, 1945 |